March 29, 1966    A. T. C. BURROWS    3,242,875
CONVEYOR SYSTEMS

Filed Jan. 6, 1964    2 Sheets-Sheet 1

Inventor
Arthur Thomas Charles Burrows
By Cushman, Darby & Cushman
Attorneys

United States Patent Office 3,242,875
Patented Mar. 29, 1966

3,242,875
CONVEYOR SYSTEMS
Arthur Thomas Charles Burrows, Stevenage, Hertfordshire, England, assignor to Geo. W. King Limited, Stevenage, England, a British company
Filed Jan. 6, 1964, Ser. No. 335,744
Claims priority, application Great Britain, Jan. 5, 1962, 37,878/63
9 Claims. (Cl. 104—96)

This invention relates to conveyor systems of the type wherein load carrying trolleys are propelled along a fixed trolley track by virtue of the engagement therewith of pusher dogs or driving abutments carried by a driving chain which is itself supported at spaced points along its length from trolleys adapted to run on a second track disposed vertically above the trolley track.

It is the chief object of the invention to provide means whereby load carrying trolleys may be transferred to a conveyor of the type set forth from an auxiliary or branch line conveyor or vice versa.

According to the invention in an installation or layout including a first conveyor and second conveyor of the type set forth and wherein the trolley tracks of the two conveyors are capable of being interconnected by means of a switch point thereby to allow transfer to the trolleys from one conveyor to the other, the provision of transfer means effective on the approach to the switch point of a free or vacant pusher dog on the driving chain of the first conveyor, to propel a load trolley from a preselected point on the trolley track of the second conveyor and on to the trolley track of said first conveyor so that said trolley will be engaged and thereafter propelled by the erstwhile free or vacant pusher dog. Preferably any trolley for transfer will be held at a holding station on the second conveyor by mechanism the operation of which to release said trolley is controlled by feeler or sensing means disposed adjacent the driving chain of the first conveyor and effective, as a result of the passage of a free or vacant dog therepast to actuate the mechanism at the holding station.

Figure 1:
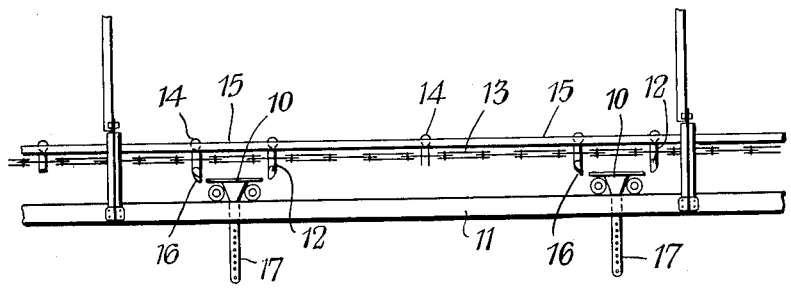
Figure 3:
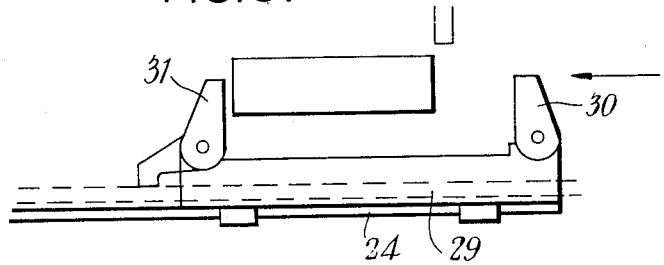
Figure 5:
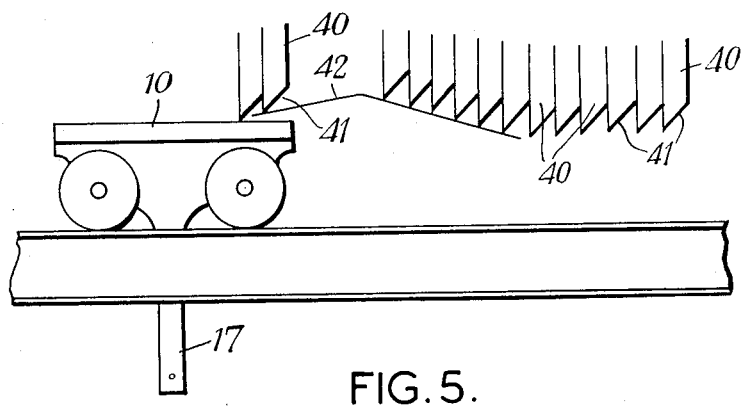
Figure 2:
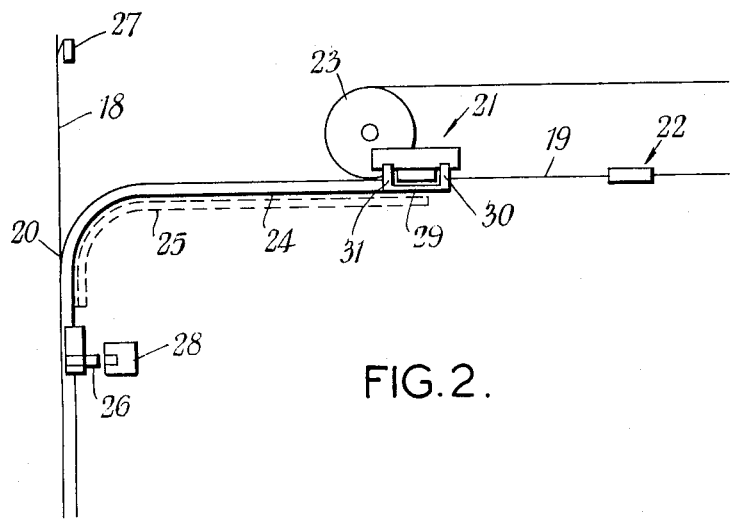
Figure 4:
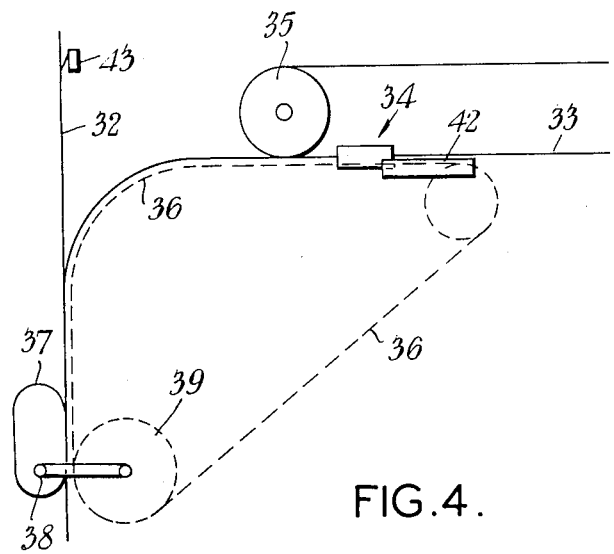

In order that the said invention may be clearly understood and readily carried into effect reference will now be made to the accompanying diagrammatic drawings in which:

FIGURE 1 shows a small portion of a conveyor and serves to illustrate the type of conveyor with which the invention is concerned, FIGURE 2 is a plan view illustrating one way in which transfer of load carrying trolleys may be effected, FIGURE 3 shows on a larger scale a detail of the layout shown in FIGURE 2, FIGURE 4 is a plan view illustrating another way in which transfer of load carrying trolleys may be effected, FIGURE 5 shows on a larger scale a detail of the layout shown in FIGURE 4.

Referring now to FIGURE 1 it will be seen that the invention is concerned with a well known type of conveyor system wherein load carrying trolleys 10 are propelled along a fixed trolley track 11 by virtue of the engagement therewith of pusher dogs or abutments 12 which are associated with an endless driving chain 13 the latter being supported at spaced points along its length by means of so-called chain trolleys 14 which run on a second track (hereinafter termed the chain track) disposed vertically above the trolley track 11. As will be seen the chain 13 is also equipped with so-called retainer dogs 16 which serve to prevent over-running of the trolleys in the event, for example, that they are being moved along a downwardly inclined path. Each of the load trolleys 10 is provided with a depending load bar 17 from which loads to be transported are suspended. A conveyor system such as that briefly described above is well known and further description is not considered necessary.

In the present case it is proposed to provide a conveyor of the kind above described, such conveyor being hereinafter referred to as the main conveyor and to make provision at a selected point along such conveyor for the introduction of load carrying trolleys formerly present on an auxiliary or storage conveyor which is of the same general type as the main conveyor.

In the embodiment shown in FIGURE 2, 18 generally denotes the main conveyor while 19 denotes the auxiliary or storage conveyor. In order to allow for the requisite transfer of trolleys from the conveyor 19 to the conveyor 18 the trolley track of the auxiliary conveyor 19 is directed towards the trolley track of the main conveyor 18 and junction between the two tracks is effected by means of a conventional track switch or switch point 20. At a selected point on the auxiliary conveyor the final holding or storage station of an indexing mechanism is located, such indexing mechanism being of a type commonly employed in conveyors of the type with which the invention is concerned. As examples of indexing mechanisms prior Patents Nos. 924,900, 736,587, 736,669 and 736,670 may be quoted. The arrangement is such that when the indexing mechanism is operative any trolley arriving at the final station which is indicated at 21 will be held thereat while the following trolleys will be held at spaced stations preceding said final station, a second such station being indicated at 22. With such indexing mechanism release of a trolley from the final station 21 will result in any following trolleys being automatically moved forward by one station. Disposed forwardly of the final holding station is a terminal wheel or sprocket 23 around which the driving chain of the auxiliary conveyor is caused to pass so that between said final station 21 and the switch point 20 the normal driving chain of the auxiliary conveyor will not be present above the trolley track of the auxiliary conveyor. It may be mentioned here that the final station will be so located that the load on any trolley held thereat will be clear of and cannot possibly foul loads passing along the main conveyor 18.

Extending from the region of the final holding station on the auxiliary conveyor to a point forwardly of the junction of the main and auxiliary trolley tracks is a chain, cable or other flexible band like member 24 hereinafter termed the transfer chain which will be supported in any convenient manner so that it is capable of longitudinal movement or travel. The transfer chain 24 which will be appropriately guided by means of a skid 25 or guide rollers or the like, is arranged to follow the path of the auxiliary trolley track and as indicated above it will extend from the final holding station 21 to a point forwardly of the junction or switch point 20, the latter part thereof extending parallel and in proximity to the drive chain of the main conveyor 18. The transfer chain 24 will normally remain stationary and at a point which is normally situated just forwardly of the track switch or junction 20 it will be fitted with a drive dog or abutment 26 which is capable of projective and retractive movement into and from an operative position wherein it will engage the drive chain of the main conveyor 18 or a depending clevis or load bar attachment associated therewith. Normally the drive dog or abutment 26 on the transfer chain 24 will be in its inoperative or retracted position clear of the drive chain of the main conveyor. The operation of said drive dog or abutment 26 will be controlled by a feeler or sensing device 27 which is disposed adjacent the drive chain of the main conveyor 18 at a point upstream of the switch point or junction 20, such feeler or sensing device 27 being adapted, on passage therepast of a free or vacant pusher dog or abutment to be actuated to cause energisation of a solenoid 28 which will in turn be effective to cause projection of the drive dog or abutment 26 on said transfer chain. The feeler or sensing means 27 will also be arranged to control the mechanism at the first holding station 21 so that on approach of a free or vacant pusher dog towards the switch point or junction 20 the trolley previously held at said final station will be released and free to move.

Also coupled or attached to the transfer chain 24 in such a position as normally to engage any trolley held at the final holding station 21 is a carrier device 29 incorporating, as will be more clearly seen from FIGURE 3, a pusher member 30 and a retainer member 31, one being disposed behind and one forwardly of any trolley so held. The pusher member 30 will be so constructed and/or so mounted on the device 29 that while it will hinge or deflect in one direction to allow entry of a trolley to the final station 21 it will be incapable of hinging or deflecting in the opposite direction and will when the trolley is located forwardly thereof be effective to push the latter on actuation of the transfer chain 24. The retainer member 31 will be so constructed and/or mounted as to act in the opposite manner to that of the pusher member.

The mechanism as so far described is adapted to operate as follows:

With the main conveyor 18 in operation load trolleys will be propelled along the main trolley track and a load trolley will be held at the final holding station 21 on the auxiliary conveyor 19 in readiness for transfer to the main trolley track. When an empty or vacant pusher dog or abutment on the drive chain of the main conveyor approaches the switch point or junction 20 of the respective auxiliary conveyor and main trolley tracks the feeler or sensing means 27 will be effective to cause release of the trolley from the final holding station 21 and also to project the drive dog or abutment 26 on the transfer chain 24 into its operative position so that it will engage the drive chain of said main conveyor or a depending clevis or like attachment on said chain thereby causing the transfer chain 24 to travel with the drive chain of the main conveyor. As described above the trolley present at the holding station will be engaged by the pusher and retainer members 30, 31 on the carrier device 29 attached to the transfer chain 24 so that movement of the latter will result in movement of said trolley towards and eventually on to the trolley track of the main conveyor 18 where it will be engaged and subsequently driven by the erstwhile free or vacant pusher dog or abutment on the drive chain of the main conveyor. At a predetermined point the drive dog or abutment 26 constituting the drive connection between the transfer chain 24 and the drive chain of the main conveyor 18 will be retracted so that said transfer chain may then be restored to its initial position. Subsequently to the removal of the load trolley from the final holding station 21 the indexing mechanism will be effective in known manner to feed a further trolley thereto so that shortly after one transfer operation the whole transfer mechanism will be ready for further operation on approach of another free or vacant pusher dog or abutment towards the switch point or junction.

The transfer chain 24 may be restored to its initial position after each actuation in any convenient manner. For example a counterbalance weight, springs or other appropriate means may be employed or a motor may be operated appropriately to drive said chain in the required direction. As another alternative a continuously driven motor may be operatively coupled to the transfer chain via a free wheel device so that when said chain is moved to effect a transfer the free wheel will be operative while upon conclusion of the operation the motor will then be effective to restore the transfer chain to its initial position.

In the foregoing it has been assumed that the movement of the transfer chain 24 will be reciprocatory i.e. a forward motion to effect transfer followed by a reverse motion back to its initial position in readiness for a further operation.

Instead of reversing the movement of the transfer chain after each operation to restore it to its initial position it may be possible however by providing two or more sets of drive dogs or abutments such as 26 and devices such as 29 appropriately spaced along the chain 24 to arrange that the latter will move successively in the same direction as a result of each operation, i.e., after one operation another drive dog or abutment 26 and a further device 29 incorporating pusher and retainer members 30, 31 will be appropriately disposed in relation respectively to the switch point 20 and the final holding station 21 in readiness for a further operation.

In the embodiment shown in FIGURES 4 and 5, 32 denotes a main conveyor while 33 denotes an auxiliary or storage conveyor both conveyors again being of the same general type as those employed in the preceding embodiment and as illustrated in FIGURE 1. In this case the auxiliary conveyor 33 is also equipped with an indexing mechanism of known type the final holding station of such mechanism being indicated at 34. As before the final station 34 will be so located that the load on any trolley held thereat will be clear of and will not foul any loads carried by load trolleys on the trolley track of the main conveyor 32. At a point just forward of the final station 34 of the indexing mechanism the drive chain of the auxiliary conveyor is caused to pass around a terminal wheel or sprocket 35 so that from said station up to the junction point with the main trolley track there will be no normal drive chain for propelling the load trolleys on to the main conveyor 32.

In place of the normal drive chain it is proposed to provide an endless chain 36 hereinafter termed the transfer chain which is so arranged that a section of its path of travel will extend from said final station to a point just forwardly of the junction between the trolley tracks of the main and auxiliary conveyors 32, 33. In the embodiment illustrated the transfer chain 36 which is arranged to travel over the appropriate section of the auxiliary trolley track following the path thereof, is adapted to be driven from the driving chain of the main conveyor 32 through the medium of a further endless chain 37 which is fitted with outwardly projecting dogs or the like adapted to mesh with said driving chain or abutments associated therewith and thereby to drive a sprocket wheel or the like 38 which is drivingly coupled to a sprocket 39 around which the transfer chain 36 passes.

The transfer chain 36 will carry two sets of what may for convenience be termed "ratchet tooth means," the two sets being arranged in parallel relationship to extend along the length of the chain. As will be more clearly seen from FIGURE 5 each set of ratchet tooth means will comprise a plurality of individual strip like elements 40 which are arranged in edge to edge relationship and are so supported as to be capable of individual upward displacement relatively to the chain from an operative position wherein the lower end thereof will contact a load trolley to an upper position wherein said lower end will ride over the top of a trolley. The lower end of each strip like element 40 is chamfered or as indicated at 41 so angled that when the chain is viewed from the side each set of said elements will provide below the chain a series of teeth or serrations and will simulate a toothed rack, the teeth of which are however individually displaceable. The arrangement will be such that teeth of one set will be oppositely angled with respect to those of the other set, i.e., in one set the angled ends of the strip like elements will incline upwardly from front to rear having regard to the direction of travel of the chain 36 while in the other set the angled ends will incline downwardly from front to rear. With the arrangement indicated there will be effectively two oppositely acting ratchet like means i.e. movement of a trolley relatively to the transfer chain 36 in one direction will be effective to displace elements of the second set, while reverse relative movement will effect displacement of the elements 40 of the second set and will be ineffective to displace those of the first. In prior Patent No. 781,733 there is a disclosure of similar individually displaceable ratchet teeth like elements and reference may be made to the specification of that patent for a better understanding of the principle involved. In that case however the carrier or support for the strip like elements was intended to remain stationary as opposed to the present embodiment wherein said elements are associated with an endless travelling chain. The transfer chain 36 will be driven continuously during such times as the main conveyor is operative and the arrangement is such that the strip elements 40 constituting one set of ratchet tooth means will be adapted to function as pusher dogs, i.e., will be effective to propel trolleys while the strip elements 40 of the second set will be adapted to act as retainer dogs to prevent undersired free forward movement of trolleys relatively to the transfer chain 36.

Conveniently disposed adjacent the final holding station 34 on the auxiliary conveyor 18 and also adjacent the junction point of the two conveyors are ramp or plough means such as indicated at 42, FIGURE 5, which will be operative to render the ratchet tooth means on the transfer chain 36 ineffective at appropriate times. Thus when the trolley is held at the final station 34 while one set of teeth i.e. those acting as retainer dogs will automatically be displaced upwardly and will ride over the trolley the teeth of the second set, i.e., those intended to function as pusher dogs would not normally be so displaced and hence the ramp or other plough means 42 will be necessary to ensure that such teeth will in fact be rendered ineffective so long as the trolley is positively held at said final station. Again in so far as the passage of trolleys along the main conveyor is concerned it will be necessary to ensure that when a transfer operation has been completed or when no transfer operation is in progress the sets of ratchet tooth means will not impede or interfere with passage of trolleys along the main trolley track. At the point of entry of trolleys to the main trolley track required displacement of the teeth may be effected by means of a fixed ramp or alternatively by simply diverting the path of the transfer chain at an appropriate point.

Located adjacent the main conveyor line 32 at a point preceding the junction between the auxiliary and main trolley tracks is a feeler or sensing mechanism 43 which will be operative, when a free or vacant pusher dog on the driving chain of the main conveyor passes that point, to cause actuation of the mechanism at the final holding station 34 on the auxiliary conveyor 33 so that any trolley held thereat will be released.

The mechanism illustrated in FIGURES 4 and 5 will operate in the following manner.

With the main conveyor 32 operative, load trolleys will be propelled along the main trolley track and one or more load trolleys for feeding on to such track from the auxiliary conveyor 33 will be held by the indexing mechanism. In these circumstances the transfer chain 36 will be driven but that set of ratchet tooth means 40 intended to function as pusher dogs will be rendered ineffective by the ramp or plough means 42 at the final holding station 34 of the indexing mechanism so that there will be no tendency to drive the trolley at such station. As previously indicated provision will be made that there will be no possibility of the ratchet tooth means interferring with load trolleys passing along the main conveyor track. As a free or vacant pusher dog on the driving chain of the main conveyor approaches the junction of the trolley track of the main and auxiliary conveyors the feeler or sensing mechanism 43 will be operative to actuate the mechanism at the final holding station 34 thereby to release the trolley thereat.

At that point the plough means 42 will be withdrawn from the transfer chain 36 so that the appropriate set of ratchet tooth means will be rendered operative and a drive will be imparted to the trolley, i.e., one strip element of one set will engage behind the trolley and act as a pusher dog while an element of the second set will depend in front of such trolley and act as a retainer dog. The trolley will thus be positively moved toward and eventually on the main trolley track so that it will be engaged by the erstwhile free or vacant pusher dog and thereafter driven along said main trolley track. Upon movement of the trolley from the holding station 34 the mechanism thereat will be reset so that a further trolley will then be held at each station in readiness for transfer. With the resetting of the mechanism at the holding station the plough means 42 associated with the transfer chain 36 and located at such station will again be rendered operative until the feeler or sensing mechanism 43 is again actuated as a result of passage of another free or vacant dog or abutment on the driving chain of the main conveyor.

By arranging for the transfer chain 36 to be in a number of successive lengths or stages which are appropriately geared together it would readily be possible to ensure progressive acceleration of any load trolley moved thereby.

Furthermore it will be appreciated that the mechanism indicated above may readily be adapted so that it will be effective to move trolleys from the main trolley track to the trolley track of an auxiliary or branch line conveyor and in such a case it might then be necessary to arrange the transfer chain that progressive acceleration or deceleration of any load trolley so diverted would take place.

It may be mentioned here that either of the mechanism hereinbefore described may be so arranged that when a transfer operation is effected the relation between the in-going load trolley and the free or vacant pusher dog on the drive chain of the main conveyor may be either of the following:

(1) The load trolley may be located ahead of the appropriate retainer dog on the main conveyor drive chain, which will mean that said trolley is momentarily left stationary on the main trolley track while the retaining dog passes thereover and until it is subsequently engaged by the pusher dog, or (2) The load trolley may be driven in at the exact location required between the pusher and retainer dog on the drive chain of the main conveyor.

What is claimed is:

1. In a conveyor system comprising in combination a plurality of individual load carrying trolleys, a main track adapted to support said trolleys, an endless driving chain located above said main track, pusher dogs depending from said chain at spaced points therealong to engage trolleys present on said main track and to propel the same along the latter, at least one switch device in said main track and an auxiliary track communicating with said main track through said switch device so that said trolleys can be diverted from said auxiliary track to said main track, the provision of transfer means operative on the approach to said switch device of a vacant pusher dog associated with said main track to positively propel a trolley from a preselected point on said auxiliary track and onto said main track for engagement and propulsion on said main track by said vacant pusher dog, said transfer means comprising an endless driven transfer chain provided with at least one set of a plurality of individually displaceable ratchet tooth means operative to be engageable with said trolley for transferring the trolley between said preselected point and said auxiliary track and between said transfer chain and said main track.

2. In a conveyor system comprising in combination a plurality of individual load carrying trolleys, a main track adapted to support said trolleys, an endless driving chain located above said main track, pusher dogs depending from said chain at spaced points therealong to engage trolleys present on said main track and to propel the same along the latter, at least one switch device in said main track and an auxiliary track communicating with said main track through said switch device so that said trolleys can be diverted from said auxiliary track to said main track, the provision of transfer means operative on the approach to said switch device of a vacant pusher dog associated with said main track to positively propel a trolley from a preselected point on said auxiliary track and onto said main track for engagement and propulsion on said main track by said vacant pusher dog, and including releasable holding means provided at said preselected point to restrain movement of a trolley on said auxiliary track and wherein said transfer means comprises (1) a transfer chain provided with driving means and (2) sensing means disposed adjacent the endless driving chain of said main track, said sensing means operative on approach of a vacant pusher dog toward said switch device to actuate said releasable holding means to release said trolley and to actuate said transfer chain driving means wherein said transfer chain is provided with a trolley carrier comprising pusher and retainer members, pivotally mounted thereon in spaced relationship, said pusher member being pivotal to engage and transfer said trolley between said preselected point and said auxiliary track, said retainer member being pivotal to engage and transfer said trolley between said carrier of the transfer chain and said main track.

3. The conveyor system as in claim 2 wherein said transfer chain driving means comprises a solenoid and retractable means cooperative with the main track driving chain, said solenoid being energizable by said sensing means to cause said retractable means to engage said main track driving chain and drive said transfer chain.

4. The conveyor system as in claim 3 including means to de-energize said solenoid after transfer of said trolley between said auxiliary track and said main track to retract said retractable means from said main track driving chain.

5. The conveyor system as in claim 4 including means to return said carrier to said preselected point on said auxiliary track.

6. The conveyor system as in claim 1 which includes a first set of individually vertically displaceable ratchet tooth means comprising strip-like elements arranged in vertical edge-to-edge relationship, the lower end of each being chamfered upwardly and rearwardly and a second set of individually vertically displaceable ratchet tooth means comprising strip-like elements arranged in vertical edge-to-edge relationship, the lower end of each being chamfered downwardly and rearwardly, said first set operative to be engageable with and transfer said trolley between said preselected point and said auxiliary track, said second set operative to be engageable with and transfer said trolley between said transfer chain and said main track.

7. The conveyor system as in claim 6 including ramp means adjacent said preselected point on said auxiliary track operatively movable to render said first set of vertically displaceable ratchet tooth means inoperative when said holding means are operative to restrain said trolley.

8. The conveyor system as in claim 6 including fixed ramp means adjacent the point of transfer of said trolley between said transfer chain and said main track to vertically displace said second set of vertically displaceable ratchet tooth means from restraining engagement with said trolley.

9. The conveyor system as in claim 1 including an endless chain operatively connected to said main track driving chain and said endless driven transfer chain to continuously drive said endless driven transfer chain.

References Cited by the Examiner
UNITED STATES PATENTS

| | | | |
|---|---|---|---|
| 2,321,253 | 6/1943 | Schellentrager | 104—50 |
| 2,845,034 | 7/1958 | Harrison | 104—96 |
| 2,853,955 | 9/1958 | Bishop et al. | 104—96 |
| 2,868,138 | 1/1959 | Bishop et al. | 104—88 |
| 2,875,704 | 3/1959 | Yates | 104—96 |
| 2,918,881 | 12/1959 | Klamp et al. | 104—88 |
| 3,081,710 | 3/1963 | Dehne | 104—88 |

ARTHUR L. LA POINT, *Primary Examiner.*

F. W. MONAGHAN, *Assistant Examiner.*